(12) United States Patent
Liu et al.

(10) Patent No.: US 6,978,060 B2
(45) Date of Patent: Dec. 20, 2005

(54) OPTICAL SWITCH PROVIDING A BI-DIRECTIONAL ROTATION OF AN OPTICAL REFLECTOR

(75) Inventors: Junhua Liu, Palatine, IL (US); Aroon Tungare, Winfield, IL (US); Min-Xian Zhang, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 18 days.

(21) Appl. No.: 10/420,078

(22) Filed: Apr. 22, 2003

(65) Prior Publication Data

US 2004/0213509 A1 Oct. 28, 2004

(51) Int. Cl.⁷ .............................................. G02B 6/35
(52) U.S. Cl. ........................................................ 385/18
(58) Field of Search ............................................ 385/18

(56) References Cited

U.S. PATENT DOCUMENTS 6,160,230 A * 12/2000 McMillan et al. .......... 200/181
2002/0021860 A1 * 2/2002 Ruan et al. .................... 385/18

* cited by examiner

*Primary Examiner*—John R. Lee
*Assistant Examiner*—Phillip A. Johnston

(57) ABSTRACT

A MEMS based optical switch comprises a bottom electrode, a cantilever electrode, and a top electrode, all of which overlay a carrier board. An absence of a voltage differential between the top and bottom electrodes locates the cantilever electrode in a neutral position between the top and bottom electrodes. A presence of a voltage differential between the top and bottom electrodes locates the cantilever electrode in a position biased toward either the top electrode or the bottom electrode.

14 Claims, 7 Drawing Sheets

OPTICAL SWITCH PROVIDING A BI-DIRECTIONAL ROTATION OF AN OPTICAL REFLECTOR

FIELD OF THE INVENTION

The present invention generally relates to micro electromechanical system (MEMS) based optical switches. The present invention specifically relates to minimizing an actuation voltage for rotating an optical reflector included within a MEMS based optical switch while maximizing a rotational range of the optical reflector.

BACKGROUND OF THE INVENTION

Current optical switch technology employing an optical reflector that can be selectively rotated between operating positions can be improved in several areas. First, maximizing the angle of rotation of the optical reflector is desirable to allow for better differentiation between the various operating positions of the optical reflector in an n×n matrix switch fabric. One advantage is a decrease in a typical spatial separation between the optical reflector and an output channel, which provides for a less bulky switch. An alternative advantage is an increase in the typical spatial separation between the optical reflector and the output channel, which reduces crosstalk and/or noise. Second, a decrease in the required voltage for rotation of the optical reflector is needed to reduce the cost of the optical switch. Third, a reduction in the vibration of the optical reflector will decrease the noise in the optical switch, which improves the overall signal to noise ratio.

SUMMARY OF THE INVENTION

One form of the MEMS based optical switch in accordance with the present invention comprises a bottom electrode, a cantilever electrode, and a top electrode, all of which overlay a carrier board. An absence of a voltage differential between the electrodes locates the cantilever electrode in a neutral position between the electrodes. A presence of a voltage differential between the electrodes locates the cantilever electrode in position biased toward the bottom electrode or the top electrode.

The foregoing form as well as other forms, features and advantages of the present invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

The present invention is illustrated by way of example and not limitation in the accompanying figures, in which like references indicate similar elements, and in which.

DETAILED DESCRIPTION OF THE PRESENTLY PREFERRED EMBODIMENTS

Figure 1:
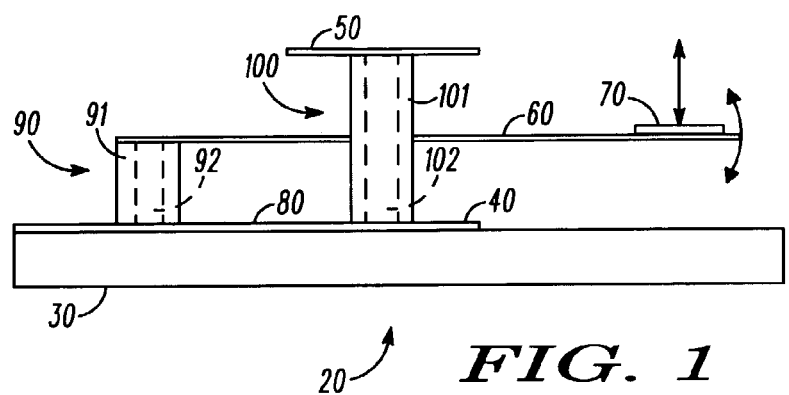
FIGS. 1–3 illustrate a neutral position of one embodiment of an optical switch in accordance with the present invention.
Figure 2:
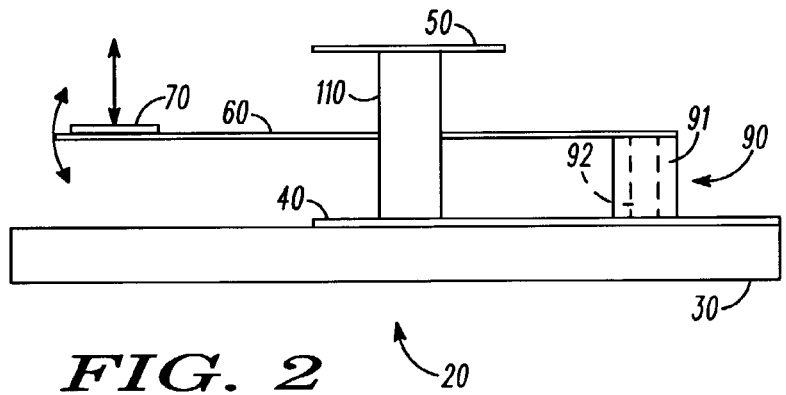
Figure 3:
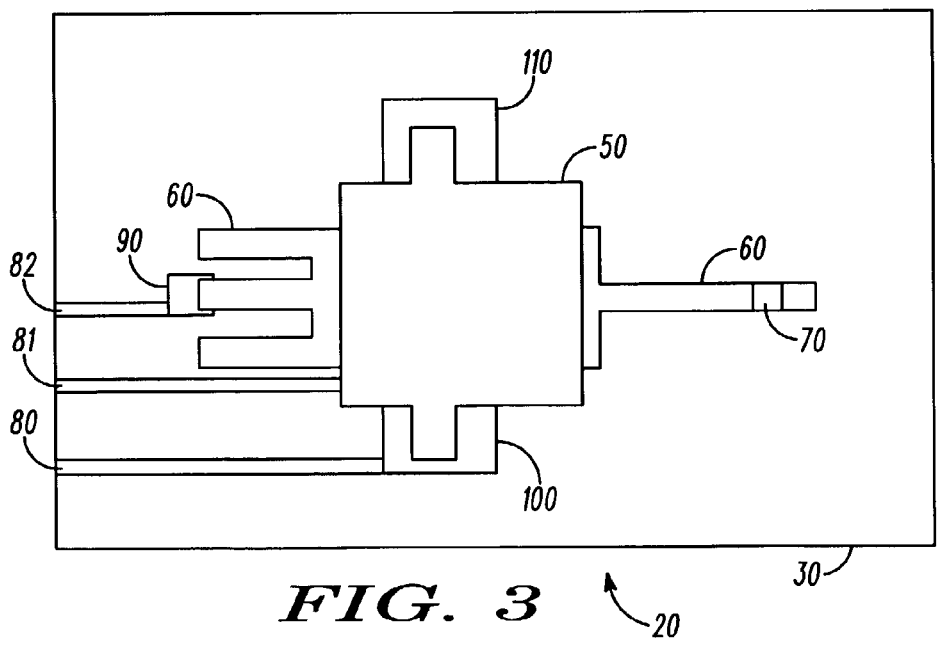

FIGS. 1–3 illustrate an optical switch 20 fabricated in accordance with an optical fabrication method of the present invention. The primary components of optical switch 20 are a carrier board 30, a bottom electrode 40 overlying carrier board 30, a top electrode 50 above bottom electrode 40, and a cantilever electrode 60 disposed between bottom electrode 40 and top electrode 50. Generally, in operation, cantilever electrode 60 is located at a neutral position as illustrated in FIG. 1 in response to an absence of a voltage differential between bottom electrode 40 and top electrode 50. Conversely, in response to a presence of a voltage differential between bottom electrode 40 and top electrode 50, cantilever electrode 60 is rotated as represented by a bi-directional curved arrow to a position biased toward either bottom electrode 40 or top electrode 50. A more detailed explanation of an operation of optical switch 20 is subsequently provided herein in connection with FIGS. 15 and 16.

Figure 4:
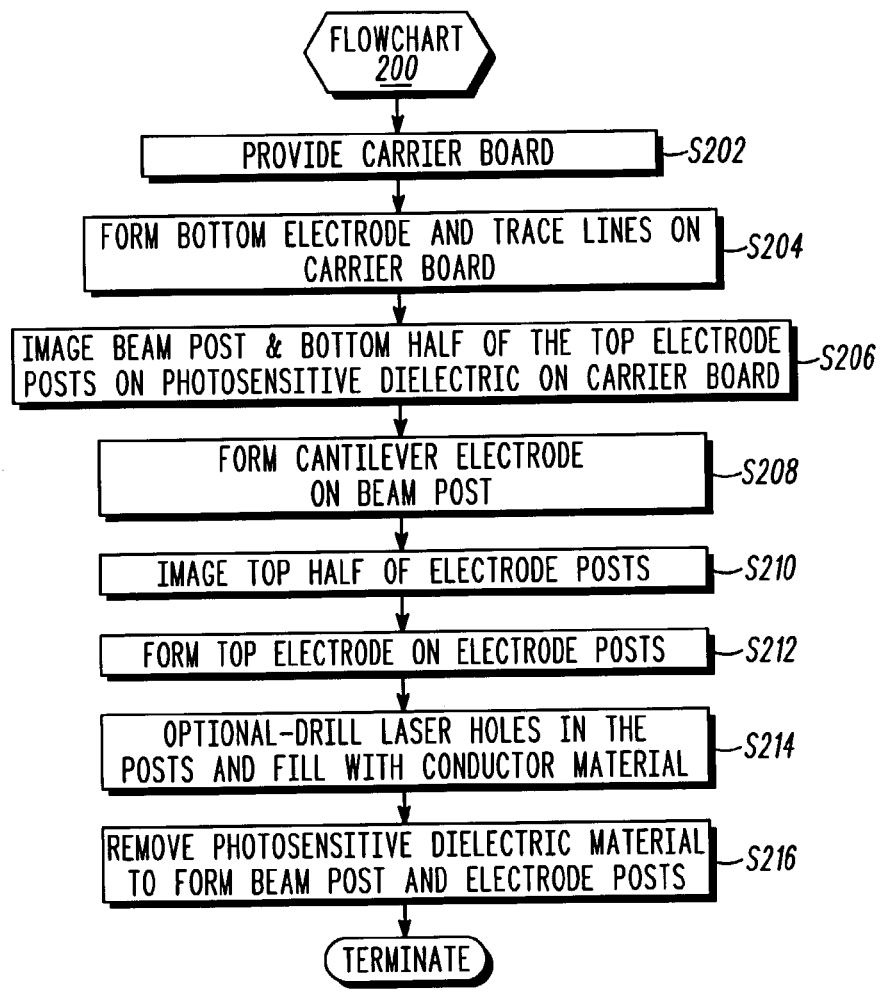
FIG. 4 illustrates a flowchart representative of one embodiment of an optical switch fabrication method in accordance with the present invention.

FIG. 4 illustrates a flowchart 200 representative of the optical switch fabrication method for fabricating optical switch 20.

During a stage S202 of flowchart 200 involves a provision of carrier board 30 (FIG. 1), made from material suitable for supporting optical switch 20 as known in the art. In one embodiment of stage S202, carrier board 30 is formed from a polymer, such as, for example, conventional polymers employed in the fabrication of printed wiring boards. Such polymers include, but are not limited to, epoxies, polyimides, and Bismaleimide Triazine resins. The preferred carrier board 30 is a copper laminated printed wiring board.

Figure 5:
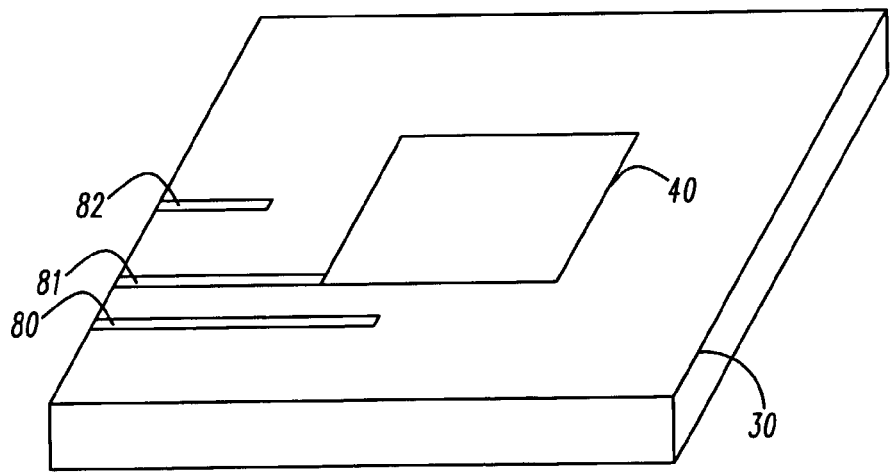
FIG. 5 illustrates a perspective view of an implementation of a bottom electrode/trace line fabrication method illustrated in FIG. 6.

During a stage S204 of flowchart 200, bottom electrode 40 (FIG. 1) and a plurality of conductive trace lines 80–82 are formed on carrier board 30 as illustrated in FIG. 5. In one embodiment, an electrode/trace line fabrication method of the present invention as represented by a flowchart 300 illustrated in FIG. 6 is implemented during stage S204.

Figure 6:
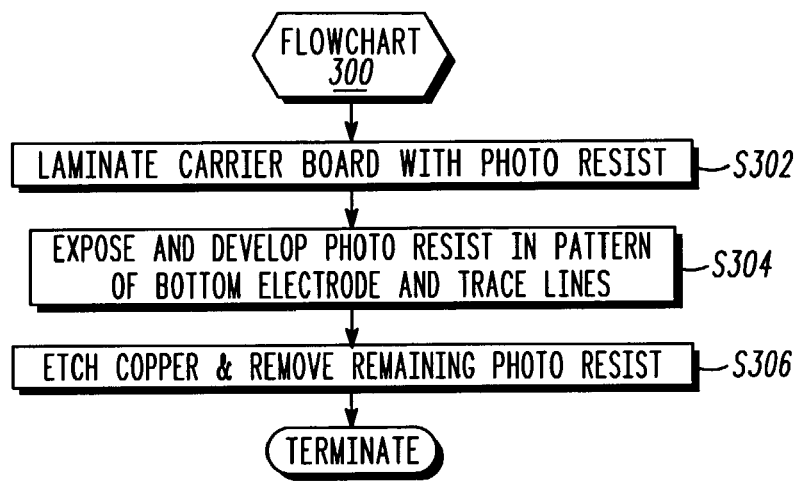
FIG. 6 illustrates a flowchart representative of one embodiment of a bottom electrode/trace line fabrication method in accordance with the present invention.

As illustrated in FIG. 6, carrier board 30 is coated with a dry film (e.g., Dupont Riston photo resist) during a stage S302 of flowchart 300. During a stage S304 of flowchart 300, a pattern for bottom electrode 40 and conductive trace lines 80–82 are exposed and developed in the dry film or photo resist. The pattern includes an establishment of an electrical communication between bottom electrode 40 and trace line 81.

During a stage S306 of flowchart 300, the photo resist is etched and developed to protect a region in a pattern of bottom electrode 40 and conductive trace lines 80–82 on carrier board 30. During a stage S308 of flowchart 300, the laminated layer of copper, which was on the carrier board 30, is etched and the remaining photo resist is removed.

Figure 7:
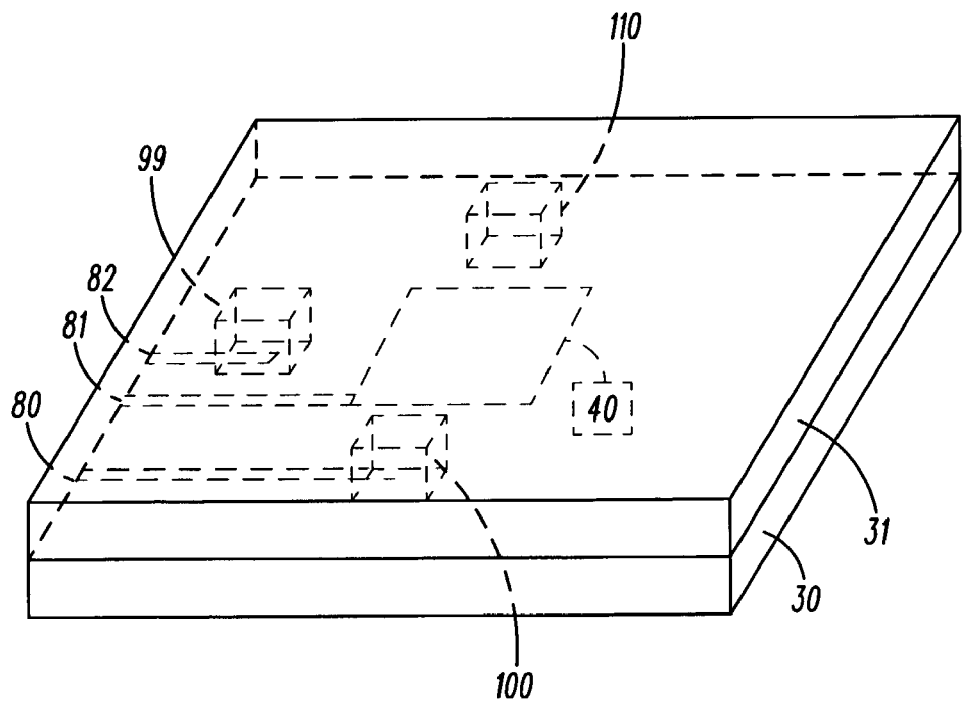
FIG. 7 illustrates a perspective view of an implementation of an electrode post fabrication method illustrated in FIG. 8.

Referring again to FIG. 4, during a stage S206 of flowchart 200, a electrode post 90 in electrical communication with trace line 82, the bottom half of the top electrode post 100 in electrical communication with trace line 80 and bottom half of the top electrode post 110 are is imaged within a photosensitive dielectric on carrier board 30 as illustrated in FIG. 7. In one embodiment, a electrode post fabrication method of the present invention as represented by a flowchart 300 illustrated in FIG. 8 is implemented during stage S206.

Figure 8:
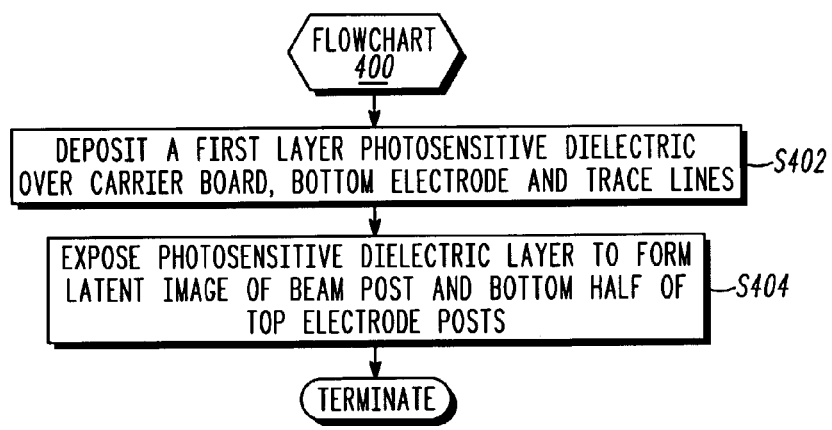
FIG. 8 illustrates a flowchart representative of one embodiment of an electrode post and electrode post fabrication method in accordance with the present invention.

As illustrated in FIG. 8, a first photosensitive dielectric layer 31 is deposited on the bottom electrode 40, trace lines 80–82, and the carrier board 30 during a stage S302 of flowchart 300. In one embodiment, first photosensitive dielectric layer 31 is formed from a polymer, such as, for example, such as Vantico's LMB 7081 photo dielectric.

During a stage S304 of flowchart 300, photosensitive dielectric layer 31 is exposed in a negative pattern of electrode posts 90, 100 and 110. The area exposed to UV light will upon further processing during stage S214 of flowchart 200 in FIG. 4, become the posts 90, 100 and 110. At this point the photosensitive dielectric layer 31 remains with the image of the posts 90, 100 and 110 shown as dashed boxes within the photosensitive dielectric layer 31 in FIG. 7.

Figure 9:
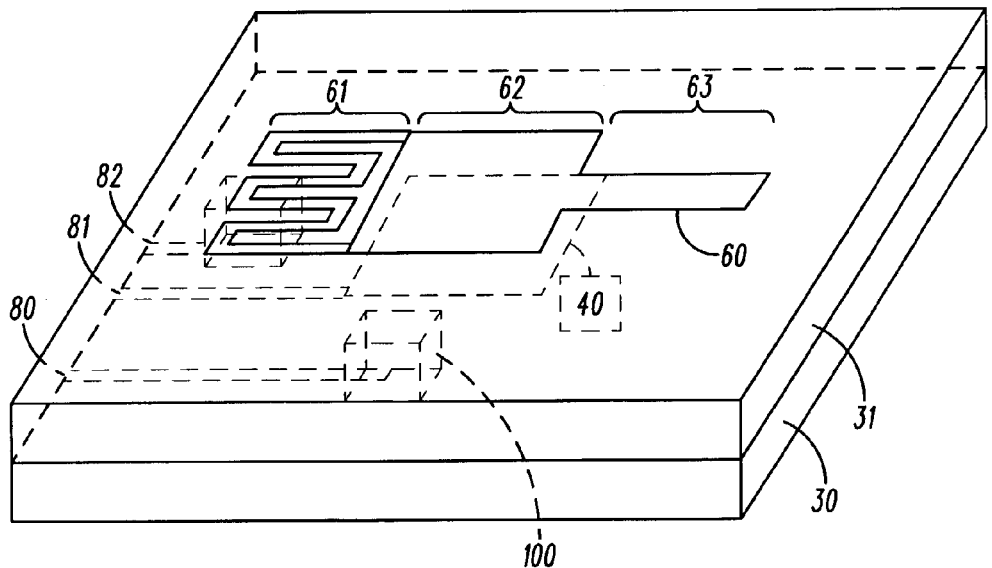
FIG. 9 illustrates a perspective view of an implementation of a cantilever electrode fabrication method illustrated in FIG. 10.

Referring again to FIG. 4, during a stage S208 of flowchart 200, cantilever electrode 60 partially overlying electrode post 90 is formed as illustrated in FIG. 9. In one embodiment, a cantilever electrode fabrication method of the present invention as represented by a flowchart 500 illustrated in FIG. 10 is implemented during stage S208.

Figure 10:
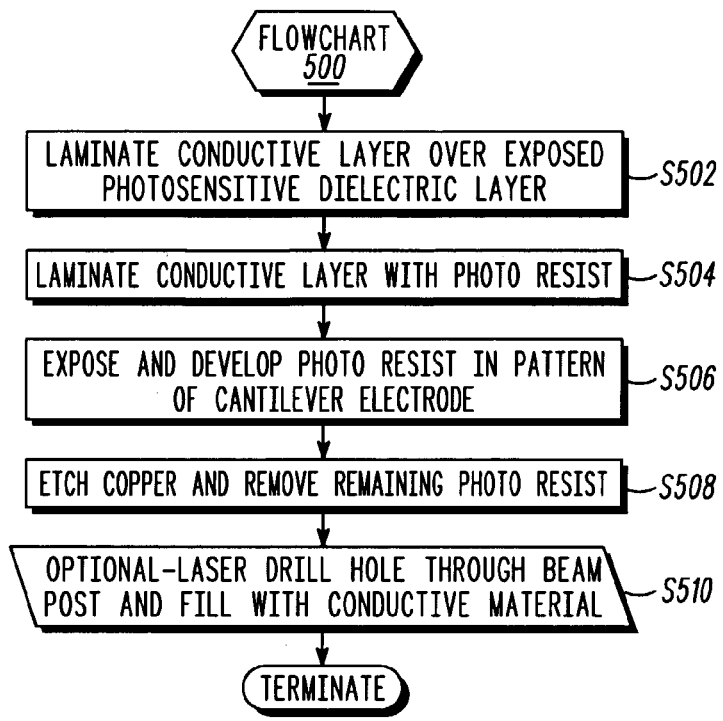
FIG. 10 illustrates a flowchart representative of one embodiment of a cantilever electrode fabrication method in accordance with the present invention.

As illustrated in FIG. 10, a conductive layer is laminated over first photosensitive dielectric layer 31 during a stage S502 of flowchart 500. During a stage S504 of flowchart 500, a dry film (e.g., Dupont Riston photo resist) is deposited on first photosensitive dielectric layer 31. During a stage S506 of flowchart 500, the photo resist is exposed and developed in the pattern of a cantilever electrode 60. In one embodiment, the pattern is developed to form cantilever electrode 60 including a serpentine segment 61, a core segment 62 and a reflective segment 63 as illustrated in FIG. 9. The serpentine segment 61 is illustrated in FIG. 9 as fingers to simplify the illustration, thought the serpentine pattern is more complex than is illustrated, as is known to those of ordinary skill in the art. During stage S508 the photo resist is etched to protect the cantilever electrode 60 pattern and during stage S510 the copper laminated on the first photosensitive dielectric layer 31 is etched. At this point it is optional to form a hole in the electrode post 90, preferably using laser drilling, and fill that hole with conductive material. Alternately, the hole can be drilled as the final stage of fabrication, during stage S214 of FIG. 4.

Figure 11:
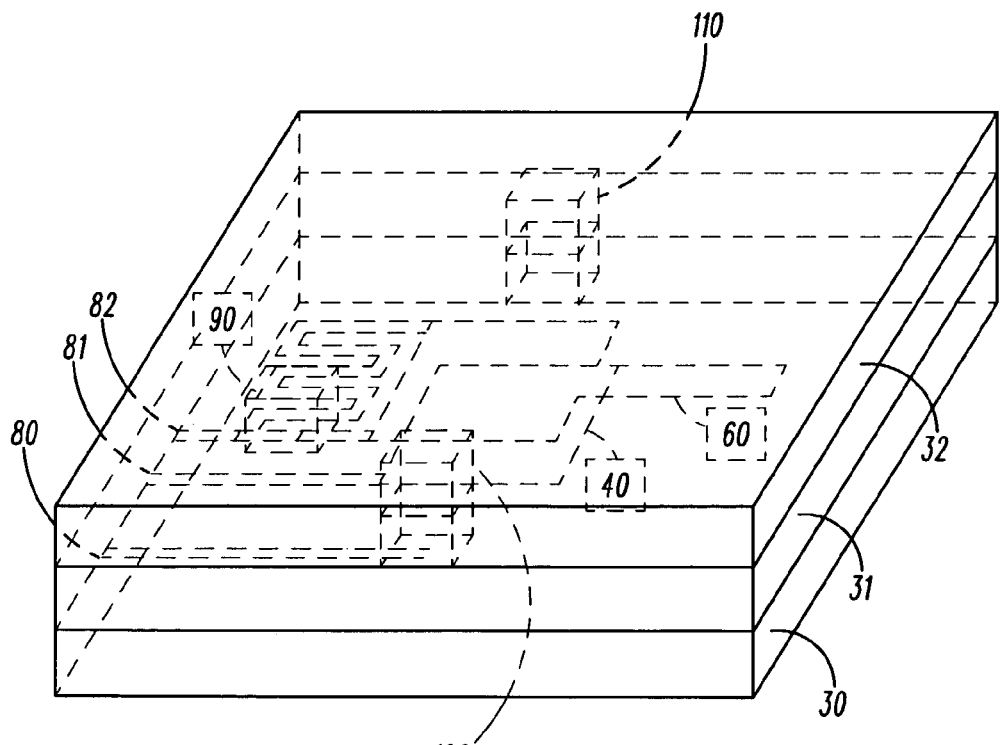
FIG. 11 illustrates a perspective view of an implementation of an electrode post fabrication method illustrated in FIG. 12.

Referring again to FIG. 4, during a stage S210 of flowchart 200, the top half of the electrode posts 100 and 110 are imaged, as illustrated in FIG. 11. In one embodiment, an electrode post imaging method of the present invention as represented by a flowchart 600 illustrated in FIG. 12 is implemented during stage S210.

Figure 12:
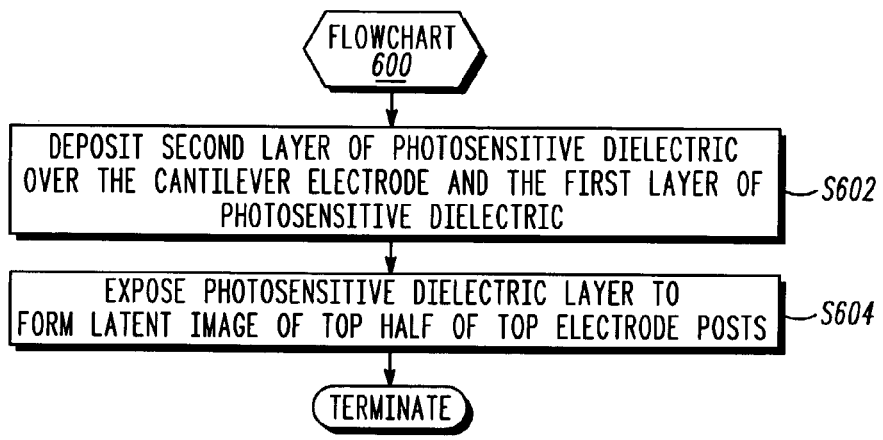
FIG. 12 illustrates a flowchart representative of one embodiment of an electrode post fabrication method in accordance with the present invention.

As illustrated in FIG. 12, during stage S602 in flowchart 600, a second photosensitive dielectric layer 32 is coated over the cantilever electrode 60 and the first photosensitive dielectric layer 31. During stage S604, the photosensitive dielectric layer 32 is exposed to UV light to form a latent imager of the top half of the top electrode posts 100 and 110.

Figure 13:
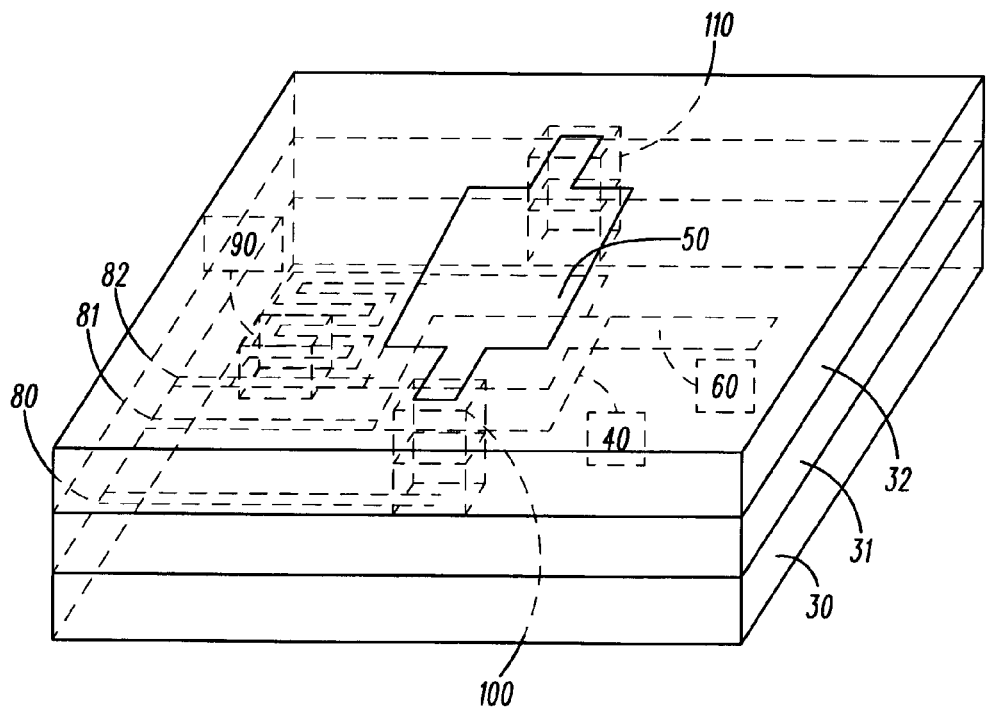
FIG. 13 illustrates a flowchart representative of one embodiment of a top electrode fabrication method in accordance with the present invention.

Referring again to FIG. 4, during a stage S212 of flowchart 200, top electrode 50 in electrical communication with electrode posts 100 and 110 is formed on electrode posts 100 and 110 as illustrated in FIG. 13. In one embodiment, a top electrode fabrication method of the present invention as represented by a flowchart 700 illustrated in FIG. 14 is implemented during stage S212.

Figure 14:
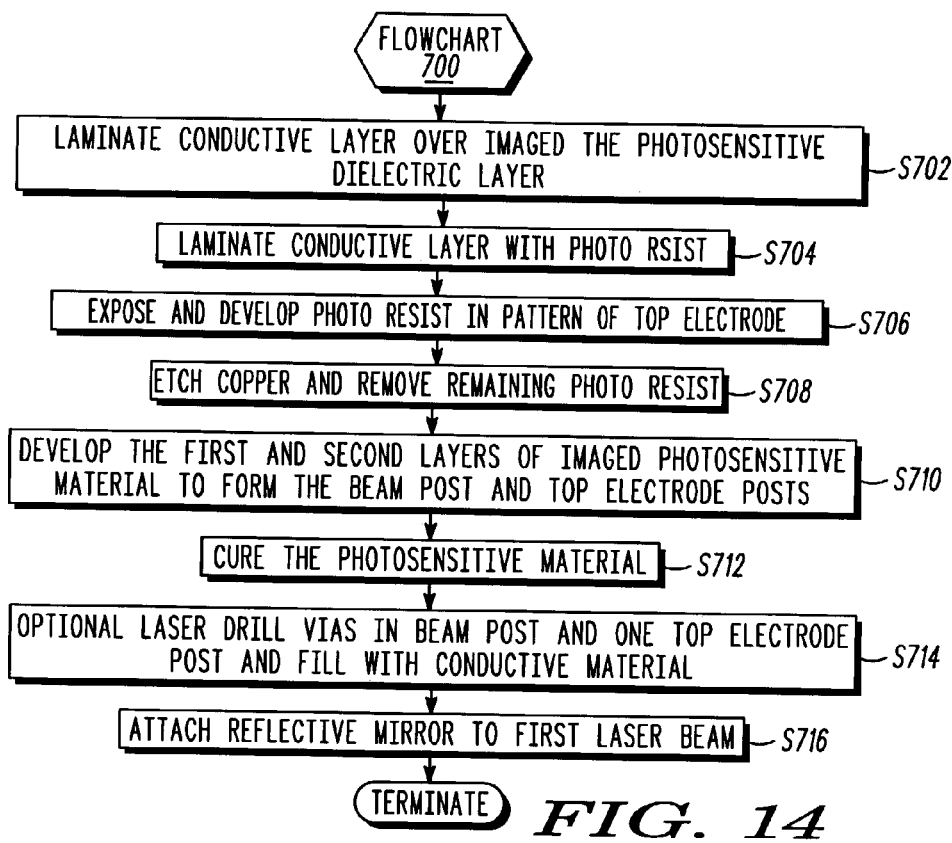
FIG. 14 illustrates a perspective view of an implementation of the top electrode fabrication method illustrated in FIG. 13.

As illustrated in FIG. 14, during a stage S702 of flowchart 700, a conductive material (e.g., cooper) is deposited on the second photosensitive dielectric layer 32. During a stage S704 of flowchart 700, the conductive material is coated with a dry film such as Dupont Riston photo resist. During a stage S706 of flowchart 700, the photo resist is exposed and developed in the pattern of the top electrode 50. During a stage S708, the photo resist is etched to protect the top electrode. During a stage S710 the copper is etched and remaining photo resist is removed. FIG. 13 shows the device as it looks after stage S710 is completed. During stage S712 of flowchart 700 the first photosensitive dielectric layer 31 and the second photosensitive dielectric layer 32 are developed to form the electrode post 90 and the top electrode posts 100 and 110. During stage S714 the photosensitive dielectric layers 31 and 32 are thermally cured in a box oven. An optional stage S716 of flowchart 700 is to laser drill holes in the electrode post 90 and top electrode posts 100. After a hole is formed in post 90, it is filled with a conductive material so that the post has a inner conductive core 92 surrounded by an insulating outer post 91 and provides electrical contact between trace line 82 and cantilever electrode 60. After a hole is formed in post 100, it is filled with a conductive material so that the post has a inner conductive core 112 surrounded by an insulating outer post 111 and provides electrical contact between trace line 80 and top electrode 50.

During stage S718 of flowchart 700 a reflective mirror 70 is attached to or formed on the section 63 of cantilever electrode 60 using techniques known to those of ordinary skill in the art.

In an additional embodiment, the bottom of the top electrode 50 and the bottom electrode 40 are coated with an insulating material such as for example a dielectric film (not shown) to prevent shorting if the cantilever electrode 60 touches the top electrode 50 or the bottom electrode 40.

A detailed explanation of an exemplary operation of optical switch 20 as illustrated in FIGS. 1–3, 15 and 16 will now be described herein. FIGS. 1 and 2 illustrate a neutral position for cantilever electrode 60 that is achieved by an application of zero volts to trace lines 80–82 or an application of identical voltages to trace lines 80–82. When cantilever electrode 60 is in the neutral position, a light beam IB directed to be normally incident upon the surface of optical reflector 70 will be reflected directly back towards a source of light beam IB as represented by the bi-directional vertical arrow.

Figure 15:
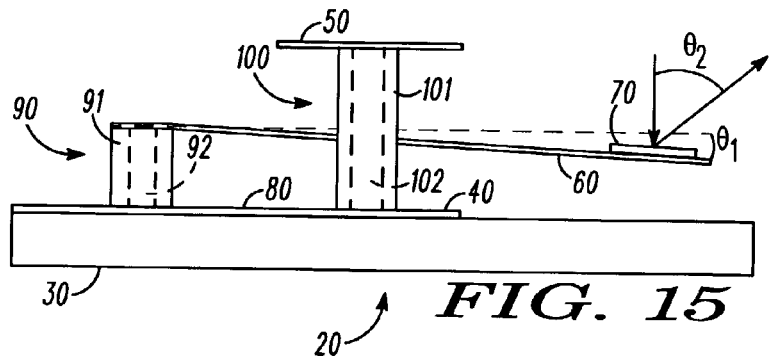
FIGS. 15 and 16 illustrate exemplary biased positions of the optical switch illustrated in FIGS. 1–3.

As illustrated in FIG. 15, cantilever electrode 60 is downwardly rotated to a biased position in response to a presence of a differential voltage between bottom electrode 40 and cantilever electrode 60. The differential voltage is preferably achieved by an application of zero volts to trace lines 80 and 82, and an application of a voltage V to trace line 81. When cantilever electrode 60 is downwardly biased toward bottom electrode 40 by a rotational angle $\theta_1$, light beam IB has an incident angle $\theta_1$ (not shown) upon the surface of optical reflector 70 and is reflected from optical reflector 70 at an angle $\theta_2$ that is twice the rotational/incident angle $\theta_1$ as represented by the reflected straight arrow.

Figure 16:
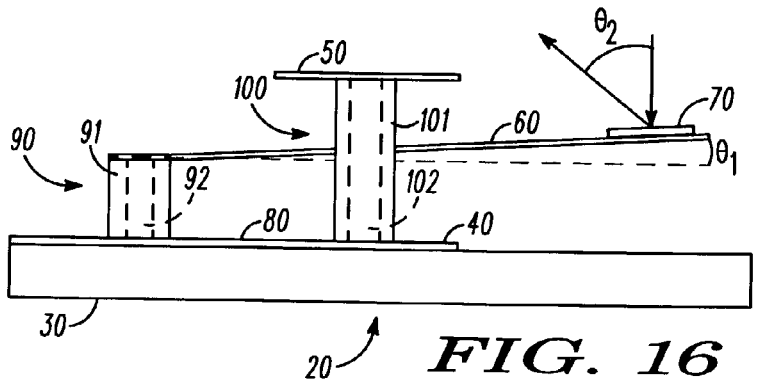

As illustrated in FIG. 16, cantilever electrode 60 is upwardly rotated to a biased position in response to a presence of differential voltage between bottom electrode 40 and top electrode 50. The differential voltage is preferably achieved by an application of zero volts to trace lines 81 and 82, and an application of voltage V to trace lines 80. When cantilever electrode 60 is upwardly biased toward top electrode 50 by a rotational angle $\theta_1$, light beam IB has an incident angle $\theta_1$ (not shown) upon the surface of optical reflector 70 and is reflected from optical reflector 70 at an angle $\theta_2$ that is twice the rotational/incident angle $\theta_1$ as represented by the reflected straight arrow.

One skilled in the art will appreciate a switching of cantilever electrode 60 from the downwardly biased position illustrated in FIG. 15 to the upwardly biased position illustrated in FIG. 16 results in a rotation of $4\theta_1$ of the light beam reflecting from optical reflector 70, and vice-versa.

It is important to note that FIGS. 1–16 illustrate a specific application and embodiment of the present invention, and is not intended to limit the scope of the present disclosure or claims to that which is presented therein. Upon reading the specification and reviewing the drawings hereof, it will become immediately obvious to those skilled in the art that myriad other embodiments are possible, and that such embodiments are contemplated and fall within the scope of the presently claimed invention.

What is claimed is:

1. An optical switch, comprising:
    a carrier board;
    a bottom electrode overlying said carrier board;
    a top electrode above said bottom electrode; and
    a cantilever electrode disposed between said bottom electrode and said top electrode; and
    an optical reflector disposed on said cantilever electrode;
    wherein said cantilever electrode is located at a new position in response to an absence of a voltage differential between said bottom electrode and said top electrode, and
    wherein said cantilever electrode is located at a position biased toward one of said bottom electrode and said top electrode in response to a presence of a voltage differential between said bottom electrode and said top electrode;
    wherein said cantilever electrode does not touch said top or said bottom electrodes.

2. The optical switch of claim 1, further comprising:
    at least one post supporting said top electrode above said cantilever electrode and said bottom electrode.

3. The optical switch of claim 2, further comprising:
    at least one trace line overlying said carrier board, wherein said at least one post establishes an electrical communication between said top electrode and said at least one trace line.

4. The optical switch of claim 1, further comprising:
    at least one post supporting said cantilever electrode over said bottom electrode.

5. The optical switch of claim 4, further comprising:
    at least one trace line overlying said carrier board, wherein said at least one post establishes an electrical communication between said cantilever electrode and said at least one trace line.

6. The optical switch of claim 1, further comprising:
    a first trace line overlying said carrier board and in electrical communication with said bottom electrode;
    a second trace line overlying said carrier board and in electrical communication with said top electrode; and
    a third trace line overlying said carrier board and in electrical communication with said cantilever electrode.

7. The optical switch of claim 1 wherein the optical reflector reflects a light beam at a first angle when the cantilever electrode is located at the position biased toward said bottom electrode.

8. The optical switch of claim 7 wherein the optical reflector reflects the light beam at a second angle when the cantilever electrode is located at the position biased toward said top electrode.

9. The optical switch of claim 7 further comprising an insulating coating on at least one of said bottom electrode and said top electrode.

10. A system for deflecting a light beam, comprising:
    means for reflecting the light beam;
    means for supporting the reflecting means;
    means for biasing the supporting means between a neutral position and a biased position; and
    wherein the supporting means does not form an electrical connection with the means for biasing.

11. The system of claim 10 wherein the biased position comprises a first biased position on one side of the neutral position.

12. The system of claim 11 wherein the biased position further comprises a second biased position on another side of the neutral position from the first biased position.

13. The system of claim 10 further comprising means for providing voltage across the biasing means.

14. The system of claim 10 wherein the supporting means is cantilevered.

* * * * *